April 23, 1968 R. L. PROPST 3,379,176

LIVESTOCK IDENTIFICATION METHOD AND APPARATUS

Filed Oct. 20, 1965 2 Sheets-Sheet 1

INVENTOR.
ROBERT L. PROPST
BY
ATTORNEYS

April 23, 1968 R. L. PROPST 3,379,176
LIVESTOCK IDENTIFICATION METHOD AND APPARATUS
Filed Oct. 20, 1965 2 Sheets-Sheet 2
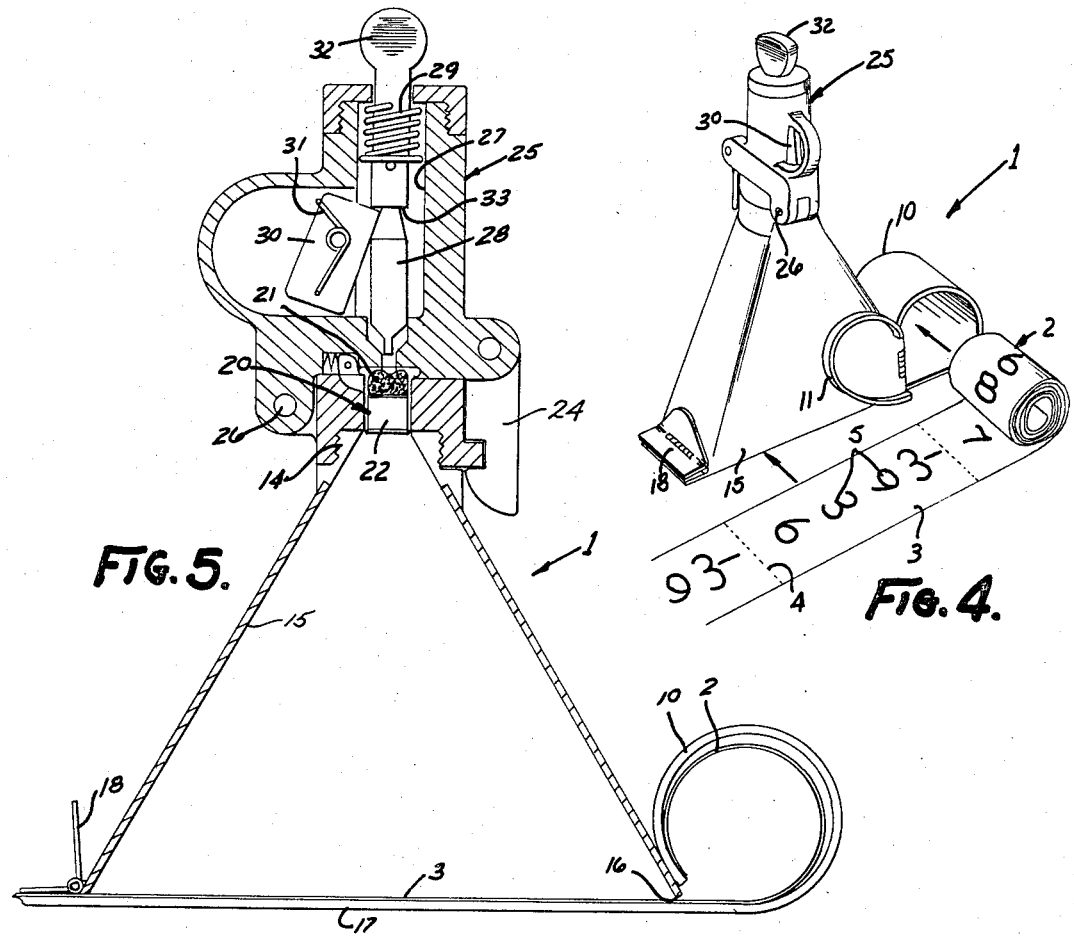
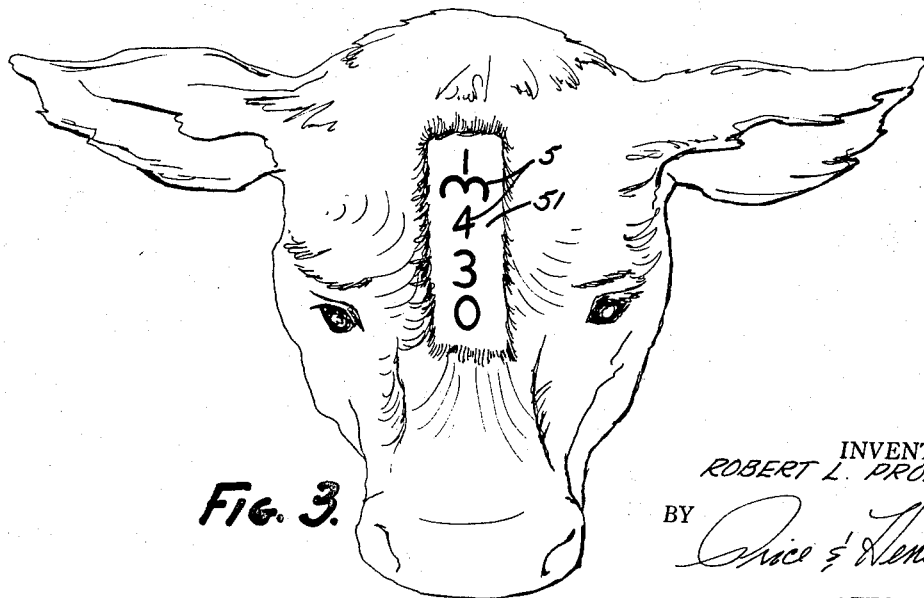
INVENTOR.
ROBERT L. PROPST
BY
ATTORNEYS

United States Patent Office 3,379,176
Patented Apr. 23, 1968

3,379,176
LIVESTOCK IDENTIFICATION METHOD
AND APPARATUS
Robert L. Propst, Ann Arbor, Mich., assignor to Herman
Miller, Inc., Zeeland, Mich., a corporation of Michigan
Filed Oct. 20, 1965, Ser. No. 498,759
19 Claims. (Cl. 119—1)

ABSTRACT OF THE DISCLOSURE

A method and apparatus for identifying livestock and individual animals which destroys the roots of the hair within a selected area on the animal's body and tattoos identifying characters within this selected area by a sudden impelling or impact force on one side of a strip containing a depilatory and indicia.

---

This invention relates to a method and apparatus for the identification of livestock and individual animals.

There has been a constant increase in the use of business systems in farm and ranch operations requiring better record and control systems. The breeding of animals is now strongly focused on the characteristics of both the male and female. This also requires accurate identification of all the individual animals. The present means for the identification of such animals have serious disadvantages.

Ear tattoos are permanent enough but since they are only visible on the inside of the ear, the animal must be caught and held in order to read the identification. Tags on neck chains or cords have the disadvantages of placing the identification in a hard place to see and there is the likelihood that the tags will be pulled off frequently. The cords or chains cannot be too strong or the animal might choke itself to death by catching it on feed bunks or fence posts and the like. Branding by chemical or heat means remains too cumbersome to use in multiple digits or letters for individual animals. Tabs glued to the animal's hair are good for one season only because of hair shedding. Horn branding must be done after an animal reaches maturity and requires a separate and different marking means before the animal's maturity. Further, many operations require dehorning of the animals for obvious reasons. Also some breeds are hornless.

An effective, permanent and readily visible marking system is also desired for disease control. Much could be done to eradicate many animal diseases if the animal's history and origin could be accurately traced. This invention would make this possible by giving each animal life-long positive identification which would permit both the individual animal and its origin to be quickly identified.

Positive and permanent identification is becoming increasingly necessary to curb rustling. Theft of animals is becoming a major problem to the industry.

Another problem is that of obliteration of present hot iron brand marking by hair growth. Regrowth of hair obscures many markings within a matter of months.

It is therefore an object of this invention to provide an improved method and apparatus for identifying livestock and individual animals.

A further object of the invention is to provide such an identification which is permanent.

A further object of the invention is to provide such an identification which can be accomplished when the animal is very young.

A still further object of the invention is to provide such an identification which is accomplished simply and utilizes portable equipment.

A still further object of the invention is the provision of such an identification which can be accomplished inexpensively even though achieving the above objectives.

Other objects of the invention include identification which permits each animal to be assigned its own individual indicia which cannot be confused with the indicia for any other animal. It also provides identification which can be positively read preferably from a reasonable distance without restraining or confining the animal. It also contemplates an identification which will not be obscured by regrowth of hair or at least the period between treatments to prevent hair regrowth will be lengthened to several years rather than months.

These and further objects of this invention will become obvious to those skilled in the relevant arts upon reading the following specification in conjunction with the accompanying drawings, wherein:

FIG. 3 is a view of an animal showing the identification when completed;

FIG. 4 is a perspective view of the apparatus comprising another aspect of this invention;

FIG. 5 is a cross sectional view showing the interior mechanism of the apparatus shown in FIG. 4;

Briefly, this invention relates to a method for identifying livestock and individual animals comprising the steps of removing excess hair from a selected area on the animal's body, destroying the roots of the hair within the selected area and tattooing identifying characters within the selected area. The apparatus comprising another aspect of this invention comprises in combination a marking strip including tattooing material in the configuration of identifying characters, a chamber for holding a marking strip adjacent the hide of an animal and means associated with the chamber for applying a depilatory or hair root destroying tissue irritant against the strip with force.

Figure 6:
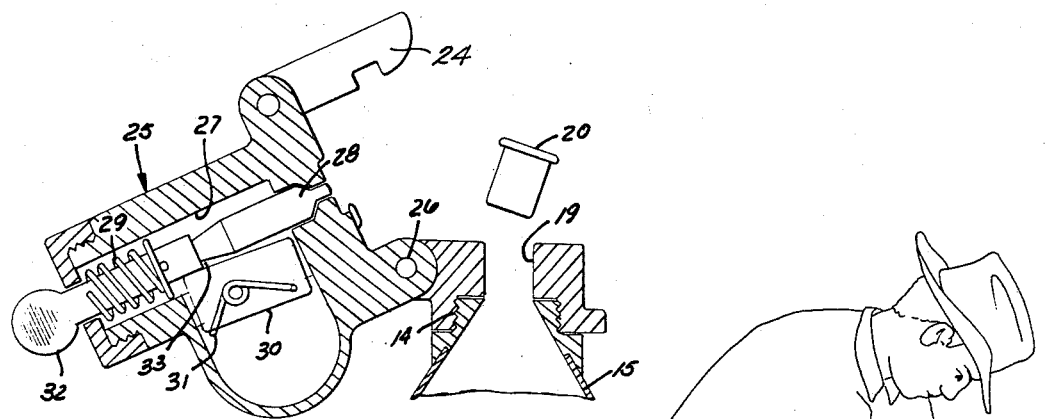
FIG. 6 is a cross sectional view similar to FIG. 5, showing the apparatus in loading position.

Turning more specifically to the drawing, the reference numeral 1 designates the apparatus for identifying livestock and individual animals (FIGS. 4–6). The apparatus 1 includes in combination a roll 2 of marking strips 3, a dispensing container 10 for holding the roll 2, a chamber 15 for holding an individual marking strip and a means 25 associated with the chamber 15 for applying a hair root destroying tissue irritant against a strip in the chamber with force (FIG. 4). The roll 2 includes a plurality of preprinted marking strips 3 connected one to the other along tear lines 4. The strips 3 are preferably comprised of a thin film of gelatin or other light, non-toxic material. Identification characters 5 are preprinted into the strips and are comprised of a suitable tattooing material, for example carbon.

The roll 2 is adapted to fit into the container 10, held therein by the small hinged closure 11. The container 10 is mounted adjacent the chamber 15, communicating therewith through the opening 16 (FIG. 5). The chamber 15 includes grooves 17 along its lower extremities for receiving a marking strip 3. The end of the marking strip is held by the spring clip 18. It will be seen that the sidewalls of the chamber 15 are flared outwardly, terminating with the opening holding a marking strip 3. At the end of the chamber 15 opposite from the marking strip, the firing mechanism 25 is pivotally secured at 26, held in firing position by means of the printing locking catch 24. The mechanism 25 includes a chamber 27 and a firing pin 28 therein, the firing pin spring loaded within the chamber by means of the spring 29. A trigger 30 is biased towards the firing pin by means of the spring 31, whereby the firing pin is cocked by pulling upwardly on the handle 32 thereof, the trigger spring biased into the formed depression 33 in the pin. It will be seen that depression of the trigger 30 with one finger causes it to become disengaged from the firing pin, the spring loaded pin being driven into the breech 19.

Cartridges 20 are provided for insertion into the breech 19 (FIGS. 4 and 5). Each cartridge includes a suitable propellant 21, for example, gun powder. Additionally, the cartridge includes a suitable hair root destroying tissue irritant 22, such as lye. It will now be seen that as the firing pin strikes the cartridge 20, the sidewalls of the chamber 15 form a blast shield, directing the tissue irritant through the chamber into the area covered by the marking strip 3. It will be seen that the chamber is shaped such that the apparatus may be placed on an animal's hide so that the marking strip is positioned adjacent it.

Figure 1:
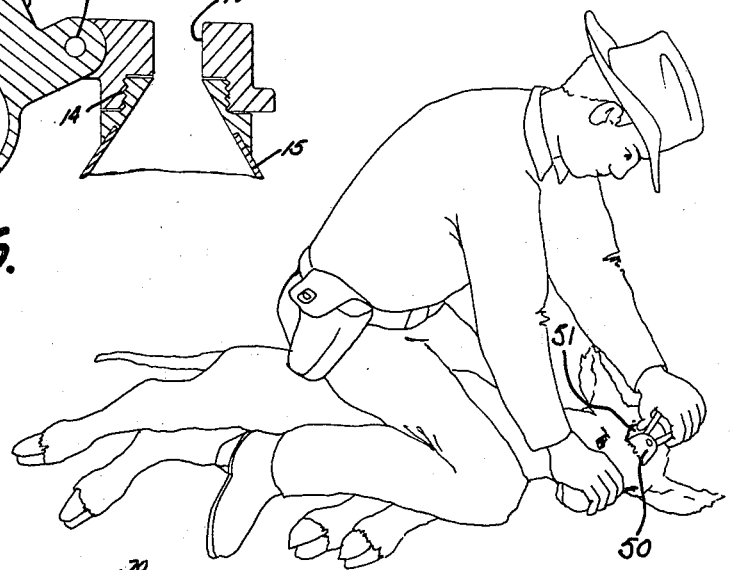
FIG. 1 is a perspective view showing the first step of the identification method comprising one aspect of this invention.
Figure 2:
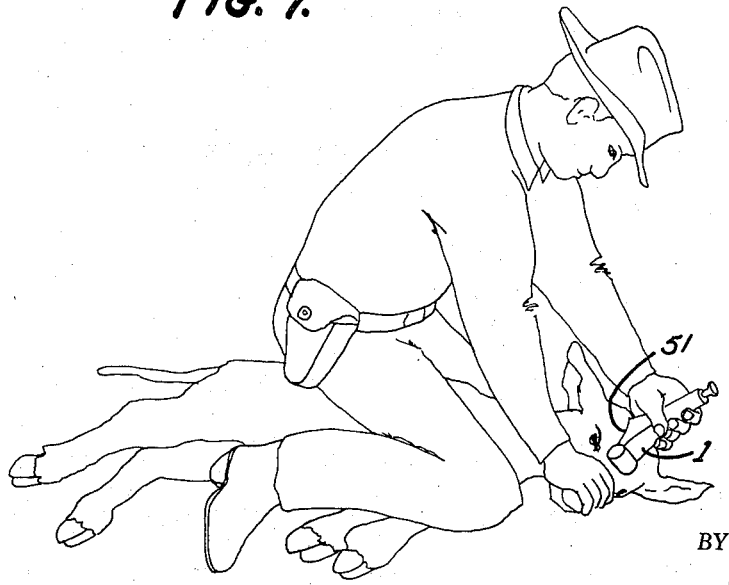
FIG. 2 is a perspective view showing another step of said method.

The method comprising this invention will now be described. As an example, the method will be described with respect to cattle. The method could also be used on other animals, such as sheep or swine. After locating a newborn calf with its mother, the herdsman catches and hand holds the animal on the ground as shown in FIG. 1. Then, holding the head steady by gripping the nose with one hand, he uses a hand clipper 50 to clip a vertical strip 51 clear of hair on the animal's forehead or other selected area. He then takes the marking apparatus 1 and makes certain that it is loaded with a cartridge 20 as described and that a fresh marking strip 3 is pulled from the roll 2 within the container 10, the strip lying within the grooves 17 and held by the spring clip 18. He then places the marking apparatus in the area cleared of hair on the animal's forehead as shown in FIG. 2, placing the marking strip 3 adjacent this area. Upon depressing the trigger 30, the firing pin 28 contacts the propellant 21 which propels the tissue irritant 22 through the chamber 15 against the strip 3 with considerable force. The tissue irritant passes through the thin strip, permanently destroying the hair roots within the area 51 and simultaneously carrying the tattooing material 5 into the animal's skin. As shown in FIG. 3, the animal is then permanently identified. The herdsman records the animal's number and the mother's number in his herd book.

The apparatus 1 is designed such that the charge is directed to the selected area only, preventing any side blasts and protecting both the animal and operator from side effects. The structure is inexpensive enough so that different sizes and shapes may be manufactured to change both the propellant charge and the irritant. Thereby, a thorough and efficient job of hair root destruction is accomplished. The chamber 15 is preferably threaded at 14 to the firing means 25, thereby enabling shields of various sizes and shapes to be substituted for animals of different sizes or for marking different parts of animals. By providing the marking strips in preprinted rolls, one has the major advantage of prevention of duplication and error. With such a markng system, even when the animal is ready for slaughter, the marked area can be skinned out and attached as a tag to the carcass for maintaining the identity while the carcass is being dressed.

It should be especially noted that the herdsman need only carry the clippers 50, the marking apparatus 1, extra rolls 2, a herd book for recording the numbers and extra cartridges 20. These items are entirely portable and it will be seen that the objections with respect to other equipment and methods noted hereinbefore have been overcome.

Figure 7:
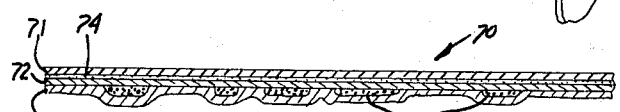
FIG. 7 is a cross sectional view of a modified type of marking strip.

It should be noted further that other propellants might be used in the place of gun powder. For example compressed air or carbon dioxide are usable as propellants. It is also possible to use tissue irritants adapted to be embedded directly into the marking strips 3 rather than in the cartridges. Such a strip 70 is shown in FIG. 7, the reference numerals 71, 72 and 73 comprising thin layers of gelatin or other light non-toxic material. The depilatory 74 is spread in a layer between the layers 71 and 72. The tattooing material 75 is positioned between layers 72 and 73 in the form of identifying characters. It will be seen that the depilatory and the tattooing material may be in micro-capsulated form within the strip. While only certain embodiments of this invention have been shown and described in detail, it might be possible to practice the invention through the utilization of certain other embodiments without departing from the spirit and scope of the invention. Such other embodiments are included as part of this invention unless the following claims specifically state otherwise.

I claim:

1. A method for identifying livestock and individual animals comprising the steps of clipping the hair from a selected area on the animal's body; providing a strip including tattooing material in the configuration of identifying characters; positioning said strip in said selected area; destroying the roots of the hair within said selected area with a tissue irritant applied with an impact force against said strip, said force also driving said tattooing material into said selected area as identifying characters.

2. A method for identifying livestock and individual animals comprising the steps of clipping the hair from a selected area on the animal's body; providing a strip including a tissue irritant for destroying hair roots and tattooing material in the configuration of identifying characters; positioning said strip in said selected area; destroying the roots of the hair within said selected area by applying an impact force against said strip and driving said tissue irritant into said selected area, said force also driving said tattooing material into said selected area as identifying characters.

3. An apparatus for identifying livestock and individual animals, comprising in combination: a marking strip including tattooing material in the configuration of identifying characters; a chamber for holding a marking strip adjacent the hide of an animal; and an impact means associated with said chamber for applying an impact force against said strip for applying a hair root destroying tissue irritant and marking material to the hide.

4. An apparatus as defined in claim 3, wherein said tissue irritant is incorporated into said strip.

5. An apparatus is defined in claim 3, wherein said means for applying said tissue irritant comprises a cartridge with a propellent and a firing means for providing said force against said strip.

6. An apparatus as defined in claim 5, wherein said cartridge also includes said tissue irritant.

7. An apparatus for identifying livestock and individual animals, comprising in combination: a dispensing container for holding marking strips; said marking strips including tattooing material in the configuration of identifying characters; a chamber proximate said container for holding a marking strip; sudden impelling means associated with said chamber for applying a hair root destroying tissue irritant against said strip with force; and said chamber being of a configuration directing said force toward said strip and positioning said strip adjacent the hide of an animal.

8. An apparatus as defined in claim 7, wherein said means for applying said tissue irritant comprises a cartridge with a propellent and a firing means for providing said force against said strip.

9. An apparatus as defined in claim 8, wherein said cartridge also includes said tissue irritant.

10. An apparatus as defined in claim 8, wherein said tissue irritant is incorporated into said strip.

11. An apparatus as defined in claim 8, said chamber detachably secured to said means for applying said tissue irritant.

12. An apparatus as defined in claim 7, including a roll of said marking strips in said dispensing container.

13. An apparatus as defined in claim 3, wherein said chamber has a deformable margin therearound adjacent said marking strip, whereby said margin of said chamber can be deformed to seal against the skin of an animal.

14. An apparatus for identifying livestock and individual animals, comprising in combination: a chamber having an open end and being of progressively increasing cross section toward said open end; a first source of dipilatory material associated with said chamber; a second source of material therewith which when embedded in an animal's skin will visually contrast with the skin; means for holding a strip across said open end; said strip having indicia thereon in the configuration of identifying characters; one of said first and second sources being incorporated in said strip; means for explosively increasing the pressure in said chamber to force the materials of said first and second sources against the skin of an animal.

15. An apparatus for identifying livestock as described in claim 14, wherein both said first and second sources are incorporated in said strip.

16. An apparatus for identifying livestock as described in claim 14, wherein said first source is incorporated in said strip.

17. An apparatus for identifying livestock as described in claim 14, wherein said second source is incorporated in said strip.

18. A method of identifying individual animals comprising the steps: under impact pressure applying a dipilatory to a selected area of the animals's skin; simultaneously forcing into selected portions of the skin in said selected area a quantity of material which contrasts with the surrounding skin when viewed under predetermined light conditions; said indicia being arranged in a predetermined pattern to form an identifying code.

19. A method of identifying individual animals comprising the steps: under impact pressure applying a hair root destroying dipilatory to a selected area of the animal's skin; simultaneously forcing into selected portions of the skin in said selected area a quantity of material which contrasts with the surrounding skin when viewed under predetermined light conditions; said indicia being arranged in a predetermined pattern to form an identifying code.

References Cited

UNITED STATES PATENTS

| | | | |
|---|---|---|---|
| Re. 11,849 | 8/1900 | Gibson | 8—94.16 X |
| 64,263 | 4/1867 | Thompson | 101—31 |
| 410,782 | 9/1889 | Casper et al. | 128—316 |
| 911,676 | 2/1909 | Pearson | 227—108 |
| 2,322,244 | 6/1943 | Lockhart | 128—173 |
| 2,348,337 | 5/1944 | Francis | 102—92 |
| 2,923,243 | 2/1960 | Crockford et al. | 102—92 |
| 3,209,695 | 10/1965 | Crockford et al. | 128—173 X |
| 3,335,722 | 8/1967 | Lowry et al. | 128—173 |

ALDRICH F. MEDBERY, *Primary Examiner.*

EUGENE R. CAPOZIO, WILLIAM H. GRIEB,
*Examiners.*